(12) United States Patent
Yeh

(10) Patent No.: US 6,253,315 B1
(45) Date of Patent: Jun. 26, 2001

(54) RETURN ADDRESS PREDICTOR THAT USES BRANCH INSTRUCTIONS TO TRACK A LAST VALID RETURN ADDRESS

(75) Inventor: Tse-Yu Yeh, Milpitas, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/130,390

(22) Filed: Aug. 6, 1998

(51) Int. Cl.[7] ........................................ G06F 9/32
(52) U.S. Cl. ........................ 712/238; 712/239; 712/242
(58) Field of Search ................................ 712/234, 238, 712/242, 239

(56) References Cited

U.S. PATENT DOCUMENTS

| | | | |
|---|---|---|---|
| 5,313,634 | * | 5/1994 | Eickemeyer ........................ 712/240 |
| 5,706,491 | * | 1/1998 | McMahan ........................... 712/234 |
| 5,768,576 | * | 6/1998 | Hoyt et al. ......................... 712/238 |
| 5,881,278 | * | 3/1999 | Tran et al. ......................... 712/242 |
| 5,964,868 | * | 10/1999 | Gochman et al. .................. 712/234 |

* cited by examiner

Primary Examiner—Kenneth S. Kim
(74) Attorney, Agent, or Firm—Leo V. Novakoski

(57) ABSTRACT

A processor pipeline includes a return stack buffer (RSB) and a top of stack pointer (RSB_TOS) to indicate the status of buffer entries. A copy of the current RSB_TOS (C_TOS) is associated with each branch instruction that is detected at the front end of the pipeline. When the branch instruction is a call instruction that is predicted taken, an associated return address is pushed onto the RSB and the current RSB_TOS is updated. When the branch instruction is a return instruction that is predicted taken, the return address indicated by the current RSB_TOS pointer is popped from the RSB and the current RSB_TOS is updated. When a branch is determined to have been mispredicted, the associated C_TOS is adjusted according to the type of branch misprediction and RSB_TOS is updated with the adjusted C_TOS.

14 Claims, 6 Drawing Sheets

RETURN ADDRESS PREDICTOR THAT USES BRANCH INSTRUCTIONS TO TRACK A LAST VALID RETURN ADDRESS

BACKGROUND OF THE INVENTION

1. Field of the Invention

The present invention relates to the field of microprocessors, and in particular, to systems and methods for predicting return addresses for call instructions.

2. Background Art

Advanced processors employ pipelining techniques to execute instructions at very high speeds. A pipelined processor is organized as a series of cascaded stages of hardware. Instruction processing is divided into a sequence of operations, and each operation is performed by hardware in a corresponding pipeline stage ("pipe stage"). Independent operations from several instructions may be processed simultaneously by different pipe stages, increasing the instruction throughput of the pipeline. By including multiple execution resources in each pipe stage, the pipelined processor can execute multiple instructions per clock cycle. To make full use of this instruction execution capability, the execution resources of the processor must be provided with sufficient instructions from the correct execution path.

Branch instructions pose major challenges to keeping the processor pipeline filled with instructions from the correct execution path. When a branch instruction is executed and the branch condition met, control flow of the processor jumps to a new code sequence, and instructions from the new code sequence are transferred to the pipeline. Branch execution typically occurs in the back end of the pipeline, while instructions are fetched at the front end of the pipeline. If changes in the control flow are not anticipated correctly, several pipe stages worth of instructions may be fetched from the wrong execution path by the time the branch is resolved and the error detected. When this occurs, the instructions must be flushed from the pipeline, leaving idle pipe stages (bubbles) until the processor refills the pipeline with instructions from the correct execution path.

To reduce the number of pipeline bubbles, processors incorporate branch prediction modules at the front ends of their pipelines. When the branch prediction module detects a branch instruction, it forecasts whether the branch direction will be taken or not taken when it is executed. If the branch direction is predicted taken, the branch prediction module indicates a target address to which control of the processor is predicted to jump. A fetch module, which is also located at the front end of the pipeline, fetches instructions beginning at the indicated target address.

Call and return instruction are branch instructions that are used to jump to and return from blocks of instructions ("subroutines"). When the call instruction is executed, control of the processor jumps to a target address at which the subroutine begins. In addition, a pointer to the instruction that follows the call instruction is pushed onto a return stack buffer (RSB). The subroutine is terminated by a return instruction, which causes processor control to jump back to the return address indicated by the RSB.

In conventional instruction sets, call and return instructions are executed unconditionally. For example, when a call instruction is detected at the front end of the processor pipeline, its return address is automatically pushed onto the return stack buffer. The call instruction is executed at the back end of the processor pipeline unless it is flushed from the pipeline prior to execution. A call instruction may be flushed, for example, when it follows the target address of a branch that is predicted taken but resolved not taken, i.e. the branch is mispredicted. In this case, the call instruction is flushed along with any other instructions on the mispredicted execution path. However, its return address is already on the RSB, since the misprediction is not detected until the back end of the pipeline.

In order to keep other return addresses synchronized with their corresponding return instructions, the RSB must be restored to its state prior to receipt of the return address for the flushed call instruction. For this purpose, a pointer to the top of the stack (TOS) prior to modification by a call instruction is saved when the RSB is updated. This TOS pointer can be used to restore the stack in the event the call instruction is flushed from the pipeline before it is executed. A similar procedure applies for return instructions.

This approach is inadequate if call and return instructions are allowed to execute conditionally. Conditional execution means that call and return instructions are not automatically taken, and mispredicted call and return instructions multiply the number and types of updates required for the RSB. The present invention addresses these and other problems raised by conditional execution of call and return instructions.

SUMMARY OF THE INVENTION

The present invention is a system and method for maintaining accurate return address data in a processor that supports conditional execution of branch instructions.

In accordance with the present invention, a return address predictor includes a return stack buffer (RSB) and a pointer module to update a pointer to the top of the return stack buffer (RSB_TOS). The RSB is updated to reflect call and return instructions that are predicted taken, and each branch instruction is associated with a copy of the RSB_TOS prior to any updates of the RSB by the branch instruction. If the call or return instruction is later determined to be mispredicted, the pointer module adjusts the associated copy of the RSB_TOS according to the type of misprediction detected, and updates the current RSB_TOS with the adjusted value.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DISCUSSION OF THE INVENTION

The following discussion sets forth numerous specific details to provide a thorough understanding of the invention.

However, those of ordinary skill in the art, having the benefit of this disclosure, will appreciate that the invention may be practiced without these specific details. In addition, various well known methods, procedures, components, and circuits have not been described in detail in order to focus attention on the features of the present invention.

The present invention includes a system and method for predicting return addresses in a processor that supports conditional execution of call and return instructions. The system stores return addresses in a return stack buffer (RSB), with the latest entry indicated by a top of stack pointer (RSB_TOS). As each branch instruction is detected, it is associated with a copy (C_TOS) of the current value of RSB_TOS, which indicates the value of RSB_TOS prior to any update by the branch instruction. If the branch instruction is later determined to be mispredicted, C_TOS represents the last valid entry for the RSB and provides a starting point for resetting the RSB.

A return address is written to the RSB and RSB_TOS is updated when the detected branch instruction is a call that is predicted taken. A return address indicated by RSB_TOS is popped from the RSB and RSB_TOS is updated when the detected branch instruction is a return that is predicted taken. No RSB update occurs for a call or return that is predicted not taken. If a branch instruction is mispredicted, its associated C_TOS is provided to a pointer module, which adjusts C_TOS according to the type of branch misprediction and updates RSB_TOS with the adjusted C_TOS.

Figure 1:
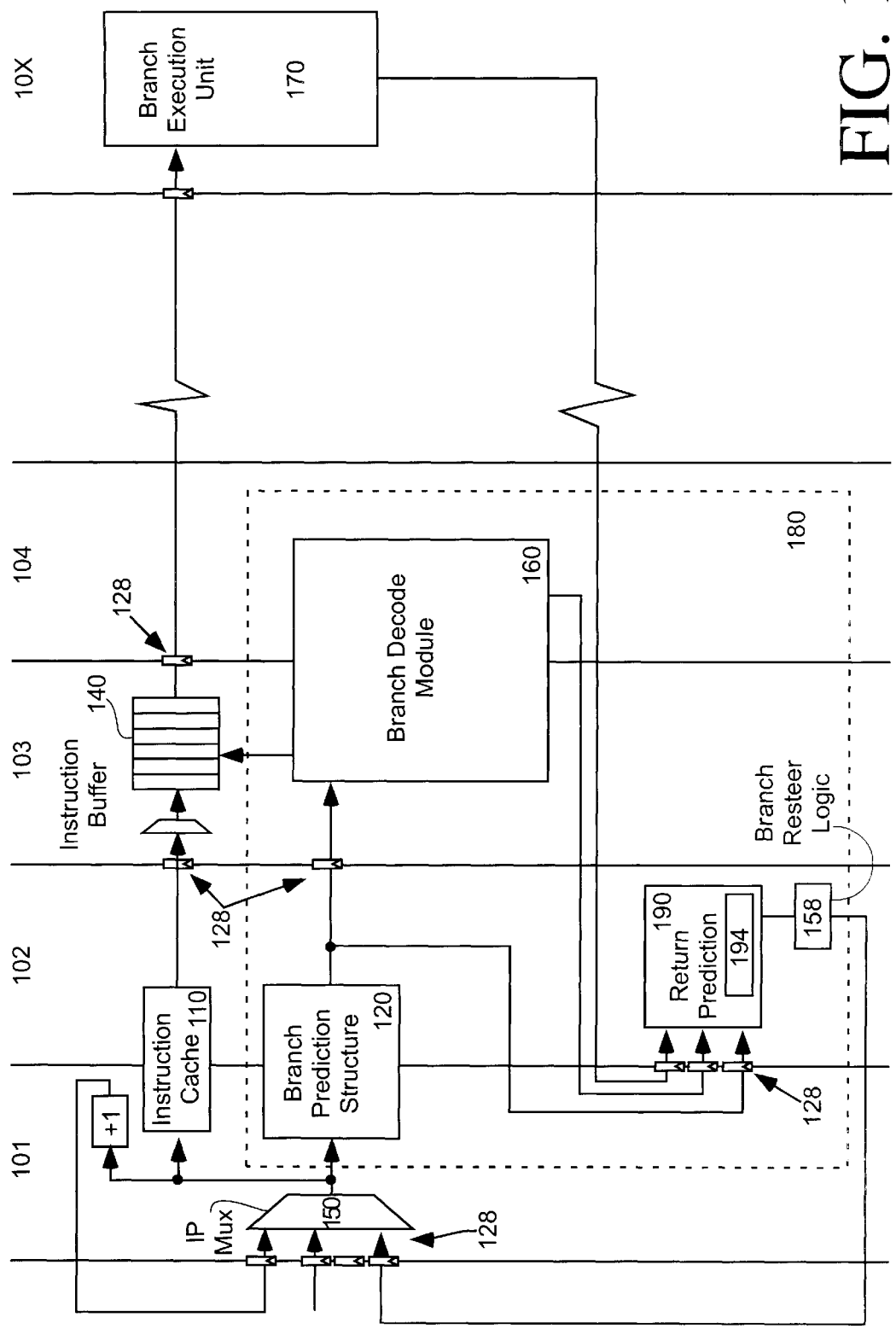
FIG. 1 is a block diagram of a processor pipeline that includes a return address predictor in accordance with the present invention.

FIG. 1 is a block diagram of a processor pipeline 100 that includes a return predictor 190 in accordance with the present invention. Pipeline 100 is represented as a series of pipeline ("pipe") stages 101–10x to indicate when different processor resources operate on a given instruction. The last stage in FIG. 1 is labeled 10x to indicate that one or more pipe stages (not shown) my separate stage 10x from stage 104. Except as noted, signals propagate from left to right, so that the response of circuitry in, e.g., pipe stage 101 on CLK cycle N is propagated to the circuitry of pipe stage 102 on CLK cycle N+1.

Staging latches 128 control the flow of signals between pipe stages 101–10x. Other embodiments of the present invention may employ different relative configurations of processor resources and staging latches 128. For example, the staging latches at the inputs of MUX 150 may be replaced by a single staging latch at its output, with the other resources and latches shifted appropriately. The present invention is independent of which relative configuration is employed.

Return predictor 190 is shown as part of a branch prediction system 180 that also includes a branch prediction structure (BPS) 120, branch resteer logic 158, and a branch decode module 160. A branch execution unit (BRU) 170, an instruction cache 110, an instruction pointer (IP) MUX 150, and an instruction buffer 140 are also shown in FIG. 1. Decode module 160 includes logic to decode branch-related instructions and provide decoded information to BPS 120 and return predictor 190. The decoded information may be used to maintain branch prediction information in BPS 120 and return predictor 190. In the case of branch predictor 190, the decoded information may include the type of branch instruction and, where appropriate, target addresses and return addresses. Decode module 160 may also implement checks on various branch related information to facilitate uninterrupted processing of branch and branch-related instructions.

Buffer 140 issues instructions received from, e.g., I-cache 110 to resources in the back end of pipeline 200. These resources include BRU 170, which executes selected branch-related instructions and generates information to update the architectural state of the processor when and if the instruction is retired. For the disclosed embodiment, BRU 170 may also provide data to return predictor 190 on the actual resolutions of branch instructions.

Return predictor 190 includes a return stack buffer 194 in which return addresses are maintained according to the predicted and actual resolutions of branch instructions. For this purpose, return predictor 190 receives signals from BPS 120, decode logic 160, and BRU 170. A top of stack pointer (RSB_TOS) tracks the entry in RSB 194 to which a return address was most recently written or the entry from which the next return address will be provided.

IP MUX 150 couples a selected IP to I-cache 110 and BPS 120. On receipt of the IP, I-cache 110 and BPS 120 perform their respective look-up procedures to determine whether they have an entry corresponding to the received IP. When an IP hits, e.g. matches, an entry, in I-cache 110, data at the associated entry (the instruction pointed to by the IP) is forwarded to the next stage in pipeline 100. When an instruction hits in BPS 120, branch prediction information is coupled to branch resteer logic 158 and branch decode module 160 is notified. Branch prediction information may also be provided by decoder 160 for branches that miss in BPS 120. A copy of RSB_TOS prior to any update of RSB 194 is associated with each branch instruction detected in pipeline 100.

For one embodiment of the invention, when a call instruction hits in BPS 120, a predicted direction (taken/not taken) is provided to return predictor 190 along with an instruction pointer (IP) for the call instruction and a target address to which the call transfers control. If the predicted direction is taken (TK), a return address is generated by incrementing the IP, and the return address is added to RSB 194. If the predicted direction is not taken (NT), RSB 194 is not modified. When a call instruction misses in BPS 120, branch decode logic 160 may provide predicted resolution and target address data for the instruction When a return instruction hits in BSP 120 or is detected by decode module 160 following a miss in BSP 120, a predicted direction is provided to return predictor 190. If the predicted direction is TK, the return address indicated by RSB_TOS is popped from RSB 194 and provided to branch resteer logic 158 for processing. If the predicted direction is NT, return predictor 190 provides no return address. When a non-call/return branch instruction hits in BSP 120 or is detected by decode module 160 following a miss, no update of RSB 194 occurs.

The conditional nature of the call/return instructions in pipeline 100 requires return predictor 190 to track and respond to a complex set of conditions to maintain accurate return address values in RSB 194 . For example, if a call instruction is predicted NT by BPS 120 or decoder 160, no return address is added to RSB 194. If it is later resolved TK by BRU 170, RSB_TOS must be adjusted to keep any other return addresses in RSB 194 aligned with the return instructions of their corresponding subroutines. If the call is predicted TK and is later resolved NT, the return address pushed onto RSB 194 is not needed and RSB_TOS 194 must be shifted to the return address associated with the last valid call instruction. Similarly, if a return instruction is predicted NT and later resolved TK by BRU 170, RSB_TOS must be updated to indicate that the corresponding return address has been popped from RSB 194. These and other scenarios are discussed in greater detail below.

Figure 2:
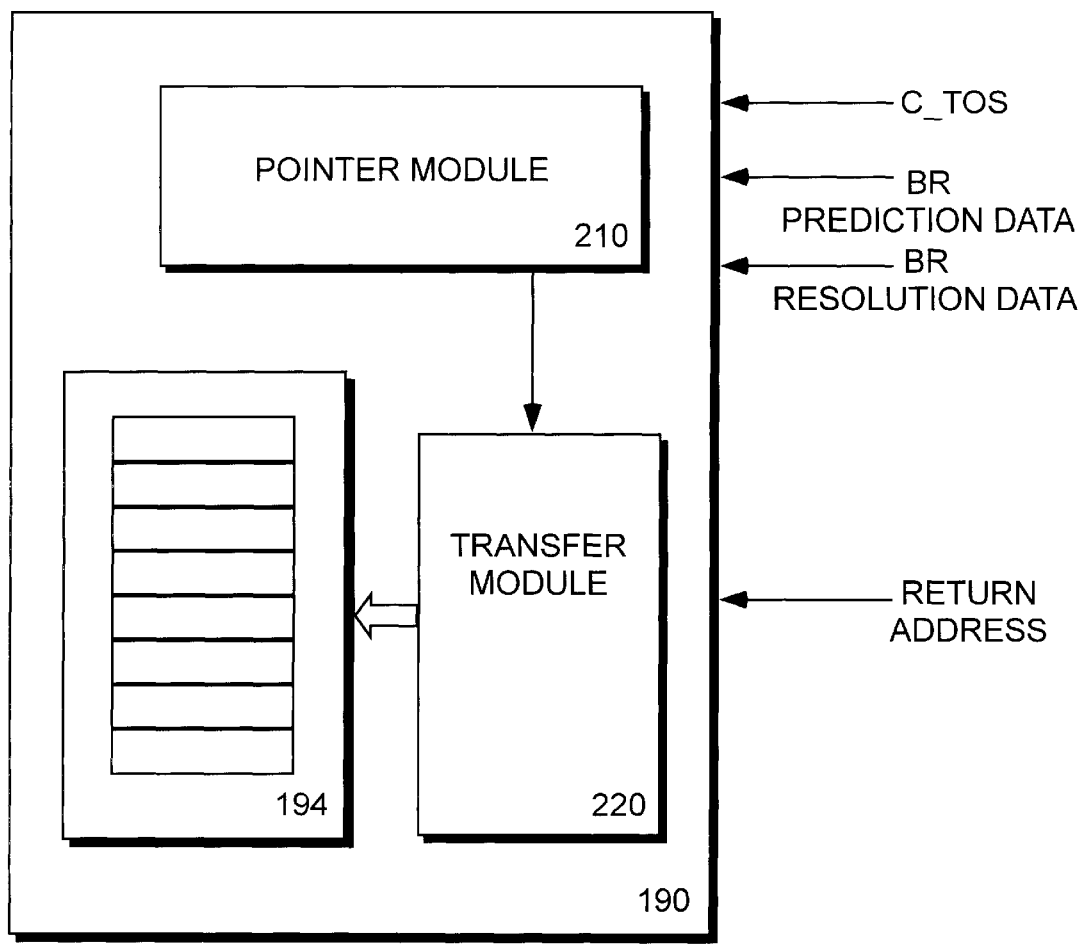
FIG. 2 is a block diagram of one embodiment of the return address predictor of FIG. 1.

FIG. 2 is a block diagram of one embodiment of return predictor 190 in accordance with the present invention. The disclosed embodiment of return predictor 190 includes a pointer module 210, RSB 194, and transfer module 220. As noted above, pointer module 210 receives branch prediction information from, e.g. BPS 120 and decoder 160, and updates RSB_TOS to reflect call and return predictions. Pointer module 210 also receives resolved branch information from, e.g., BRU 170, and adjusts RSB_TOS to reflect branch mispredictions and selected pipeline flush events. Transfer module 220 transfers return address data to and from RSB 198 at entries indicated by RSB_TOS.

For one embodiment of the invention, pointer module 210 is coupled to receive C_TOS from BRU 170 and adjust C_TOS when its associated branch instruction is mispredicted. Pointer module 210 increments, decrements, or preserves the received value of C_TOS, according to the type and nature of the branch misprediction. The adjusted value of C_TOS is then used to update RSB_TOS. For one embodiment of the invention, pointer module 210 also increments or decrements RSB_TOS as necessary for writes to and reads from RSB 194, respectively.

Transfer module 220 receives updated values of RSB_TOS from pointer module 210. For call instructions predicted TK, RSB_TOS is incremented and transfer module 220 writes an associated return address to the entry indicated by the incremented value of RSB_TOS. For return instructions predicted TK, RSB_TOS is decremented, transfer module reads the return address at the entry indicated by the decremented RSB_TOS, and provides the return address to branch resteer logic 194. For call and return instructions predicted NT and for branch instructions other than calls or returns, transfer module 220 preserves the state of RSB 194. For the disclosed embodiment, transfer module 220 receives return addresses from BPS 120 or decoder 160. Transfer module 220 also receives a write enable (WE) signal from pointer module 210.

Figure 3:
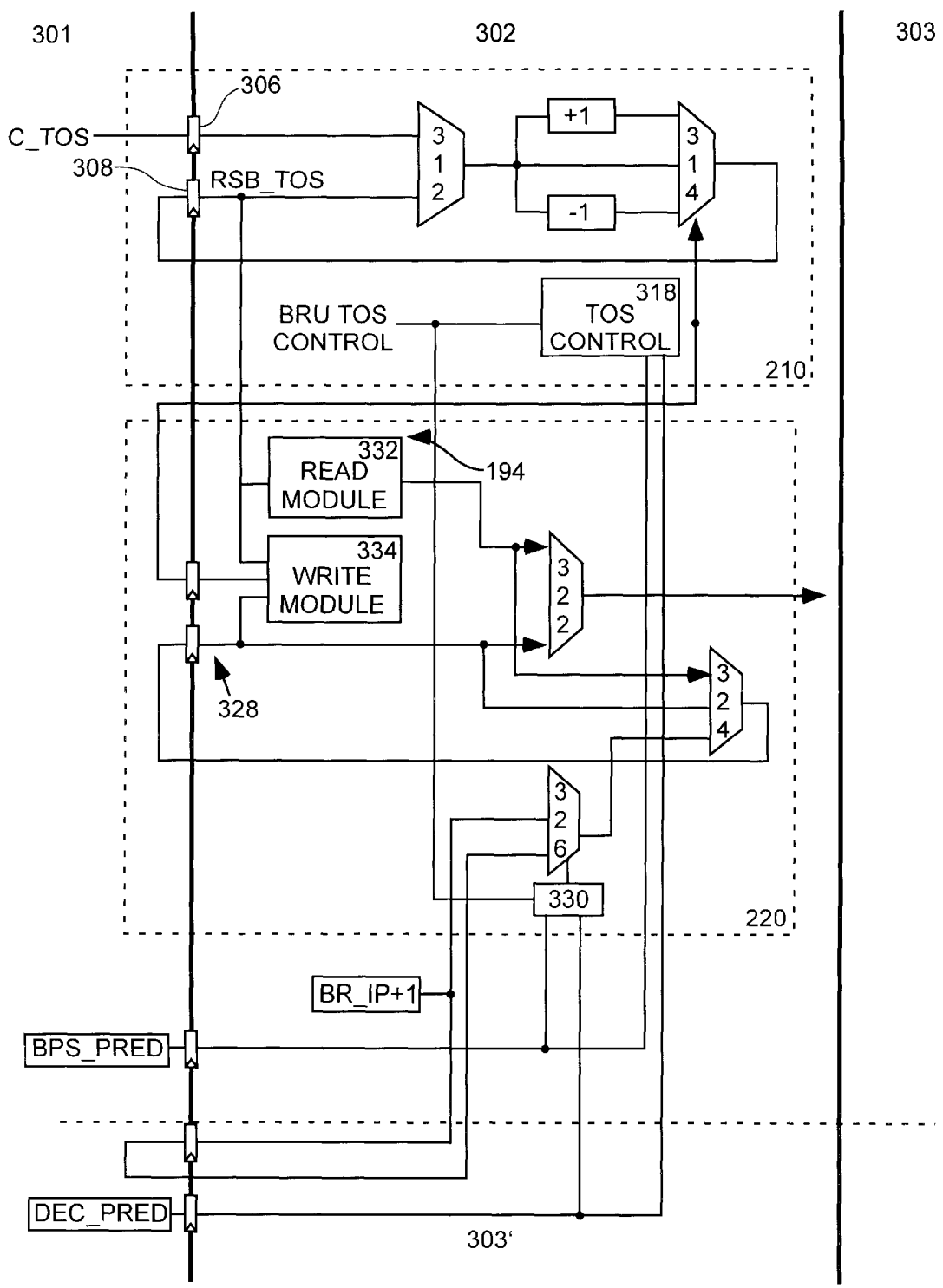
FIG. 3 is a more detailed diagram of the return address predictor of FIG. 2.

FIG. 3 is a schematic diagram showing one embodiment of a return prediction pipeline 300 in accordance with the present invention. Return prediction pipeline 300 is divided into pipeline stages ("pipe stages") 301–303 to indicate when various elements of return predictor 190 operate. The lower part of FIG. 3 shows shifted pipe stages 312'–304' to indicate timing for signals from different sources. Return prediction pipeline 300 is illustrated with exemplary embodiments of RSB 194, pointer module 210, and transfer module 220.

The disclosed embodiment of transfer module 220 includes multiplexers ("MUXs") 322, 324, 326, a TOS IP register 328, an RSB read module 332, and an RSB write module 334. Transfer module 220 is coupled to RSB 194 through read and write modules 332 and 334, respectively. Read module 332 reads an IP from RSB 194 at an entry indicated by RSB_TOS, and write module 334 writes data, e.g. an IP, to RSB 194 at an entry indicated by RSB_TOS. TOS IP register 328 stages return address IPs to write module 334 for updating RSB 194. It also provides a direct bypass to MUX 322 for short subroutines, e.g. where the write and read to RSB 194 may have insufficient time to complete.

MUX 322 couples an IP from TOS IP register 328 or from read module 332 to an output of return predictor 190 for resteering pipeline 100. Except for bypass situations, MUX 322 transfers the IP from read module 332. The read and bypassed IPs are also provided to MUX 324, along with any predicted return address IP from MUX 326. MUX 324 couples one of these IPs to TOS IP register 328. If a new return address IP is provided through MUX 326, it is coupled to write module 334 through TOS IP register 328. A predicted return address provided to MUX 324 in clock cycle N (CLK N) is written to the entry indicated by RSB_TOS in CLK N+1.

MUX 326 provides return addresses to MUX 324 when a call is predicted TK by BPT 120 or decoder 160. For the disclosed embodiment, the return address IP is generated in stage 302 (return address=Call IP+1). The return address IP may be determined by transfer module 220 or by the source of the return address. For one embodiment, decoder 160 makes branch predictions one CLK cycle later than BPS 120, and the return address is delayed by a CLK to keep the return address and RSB_TOS synchronized. This is accomplished through MUX 326, which selects between the just-determined value of the return IP and a staged value of the return IP. Logic 330 determines which entry is provided to MUX 324 for updating RSB 194.

For the disclosed embodiment, pointer module 210 includes staging latches 306, 308, MUXs 312, 314, and TOS controller 318. One input of MUX 312 receives C_TOS through latch 306 from, e.g., BRU 170. As noted above, C_TOS represents the value of RSB_TOS for the last branch instruction retired, i.e. the last value of RSB_TOS known to be valid. The other input of MUX 312 receives the output of pointer module 210, which is the current RSB_TOS. Unlike C_TOS, RSB_TOS reflects adjustments to RSB 194 from predicted call and return instructions that have yet to be retired.

For one embodiment, MUX 312 selects C_TOS or the current value of RSB_TOS according to a control signal from BRU 170 or an exception handling unit (not shown). C_TOS is provided to MUX 314 when the associated branch is mispredicted or a selected exception is detected. The current value of RSB_TOS is selected by MUX 312 when no misprediction or exception occurs.

TOS controller 318 uses MUX 314 to adjust the TOS value provided by MUX 312 to update RSB_TOS. For example, when a call or return is predicted TK by BPS 120 or decoder 160 and no branch misprediction/exception occurs, TOS controller 318 uses MUX 314 to select an incremented or decremented version of RSB_TOS, respectively. An unmodified version of RSB_TOS is selected for all other branch predictions, including calls and returns predicted NT. When a branch misprediction occurs, MUX 302 transfers C_TOS to MUX 314, and TOS controller 318 uses MUX 314 to update RSB_TOS with an incremented, decremented, or unmodified version of C_TOS, according to the type of misprediction detected.

For one embodiment of the invention, TOS controller 318 receives signals from BRU 170 when RSB_TOS is to be updated by C_TOS. TOS controller 318 generates signals to MUX 314 according to the type of update event and the type of branch instruction last retired by BRU 170.

Tables 1–3 show various updates implemented by TOS controller 318. In these tables, "i" refers to the value of RSB_TOS when the branch is predicted, i.e. before RSB 194 or RSB_TOS 198 have been updated by the branch instruction for which prediction information is currently being provided.

Table 1 shows the type of updates generated by TOS controller 318 following a branch prediction event in processor pipeline 100. The prediction events which generate the updates of Table 1 occur at the front of pipeline 100. Accordingly, C_TOS which represents architectural effects determined at the back end of pipeline 100, is not implicated. Because the present invention supports conditional execution of call and return branches, updates of RSB_TOS depend on whether the call/return instruction is predicted TK or NT.

TABLE 1

| BR TYPE | PATH PREDICTION | CURENT RSB_TOS | RSB UPDATE | UPDATED RSB_TOS |
|---|---|---|---|---|
| CALL | TK | i | PUSH | i + 1 |
| CALL | NT | i | NONE | i |
| RETURN | TK | i | POP | i − 1 |
| RETURN | NT | i | NONE | i |
| OTHER BR | NA | I | NONE | i |

Figure 4:
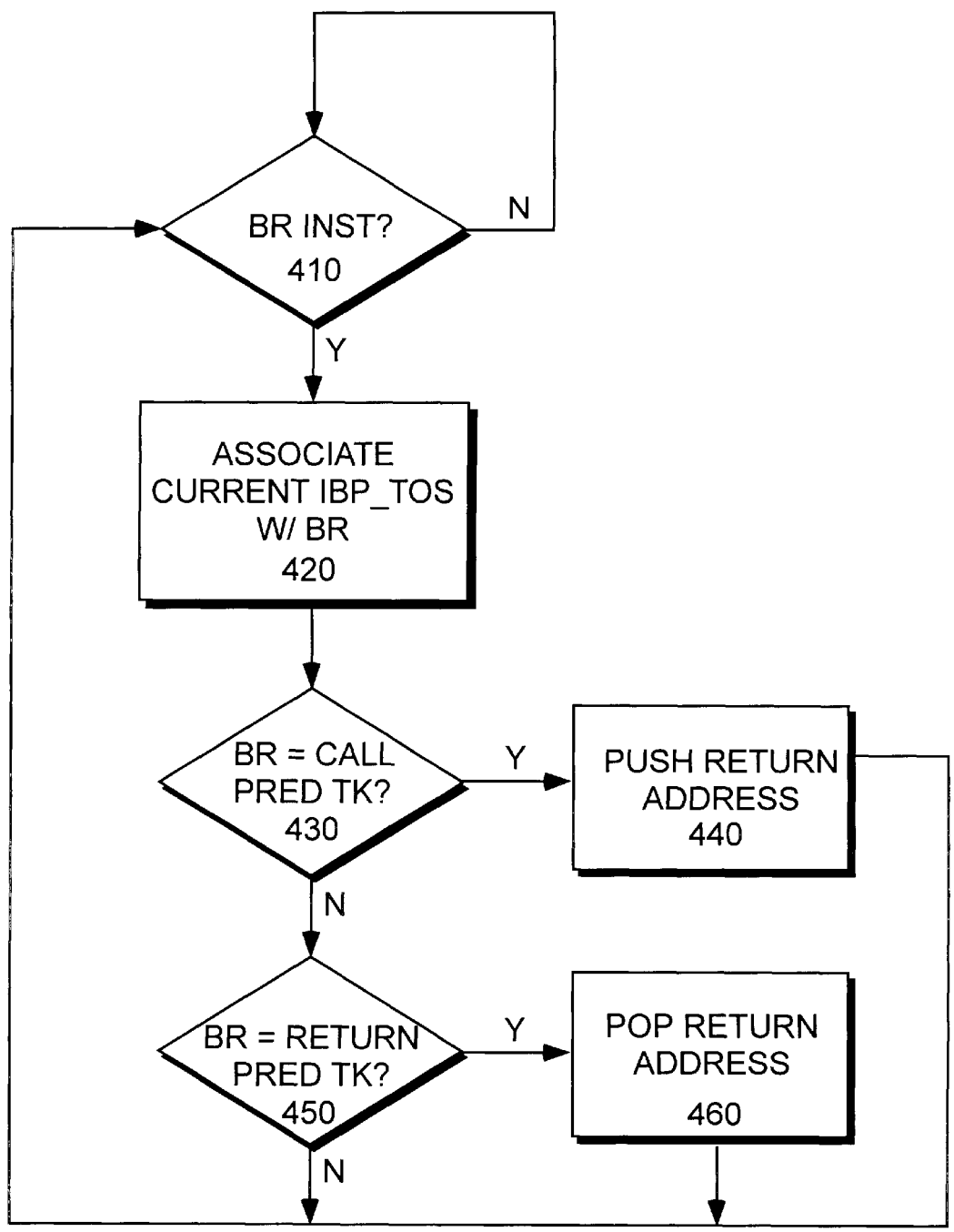
FIG. 4 is a flowchart representing a method for updating a return stack buffer according to branch prediction information.

FIG. 4 represents a method 400 for updating RSB 194 to reflect branch prediction events, as indicated in Table 1. Method 400 is initiated 410 when a branch instruction is detected at the front end of a processor pipeline. A copy (C_TOS) of the current (pre-update) value of RSB_TOS is associated 420 with the branch instruction. If the branch instruction is a call instruction and the predicted branch direction is TK 430, a return address associated with the call instruction is pushed 440 onto RSB 194, and method 400 returns to 410. If the branch instruction is return instruction and the predicted branch direction is TK 450, a return address indicated by the stack pointer (RSB_TOS) is popped 460 from RSB 194 and method 400 returns to 410. The popped return address is provided to branch resteer logic 158, which initiates a fetch of the corresponding instruction. If the branch instruction is neither a call (430) nor a return (450) that is predicted TK, no adjustments are made to RSB 194.

Table 2 summarizes the updates generated by TOS controller 318 when BRU 170 detects an exception that requires preservation of the contents of RSB 194. For example, processor pipeline 100 may implement advanced or speculative loads, which load data from memory addresses before potentially conflicting stores are performed. This procedure hides the access latency associated with memory loads behind processing of other instructions. An advanced load generates an exception when the advanced load is moved ahead of a store operation that writes data to the same memory location. For this exception, RSB 194 is preserved while the hazard is addressed.

TABLE 2

| CASE | LAST RET'D BR | BR RESOLUTION | RSB_TOS UPDATE |
|---|---|---|---|
| 1 | CALL | TK | write C_TOS + 1 to RSB_TOS |
| 2 | CALL | NT | write C_TOS to RSB_TOS |
| 3 | RETURN | TK | write C_TOS − 1 to RSB_TOS |
| 4 | RETURN | NT | write C_TOS to RSB_TOS |
| 5 | NON-C/R BRs | TK/NT | write C_TOS to RSB_TOS |

Figure 5:
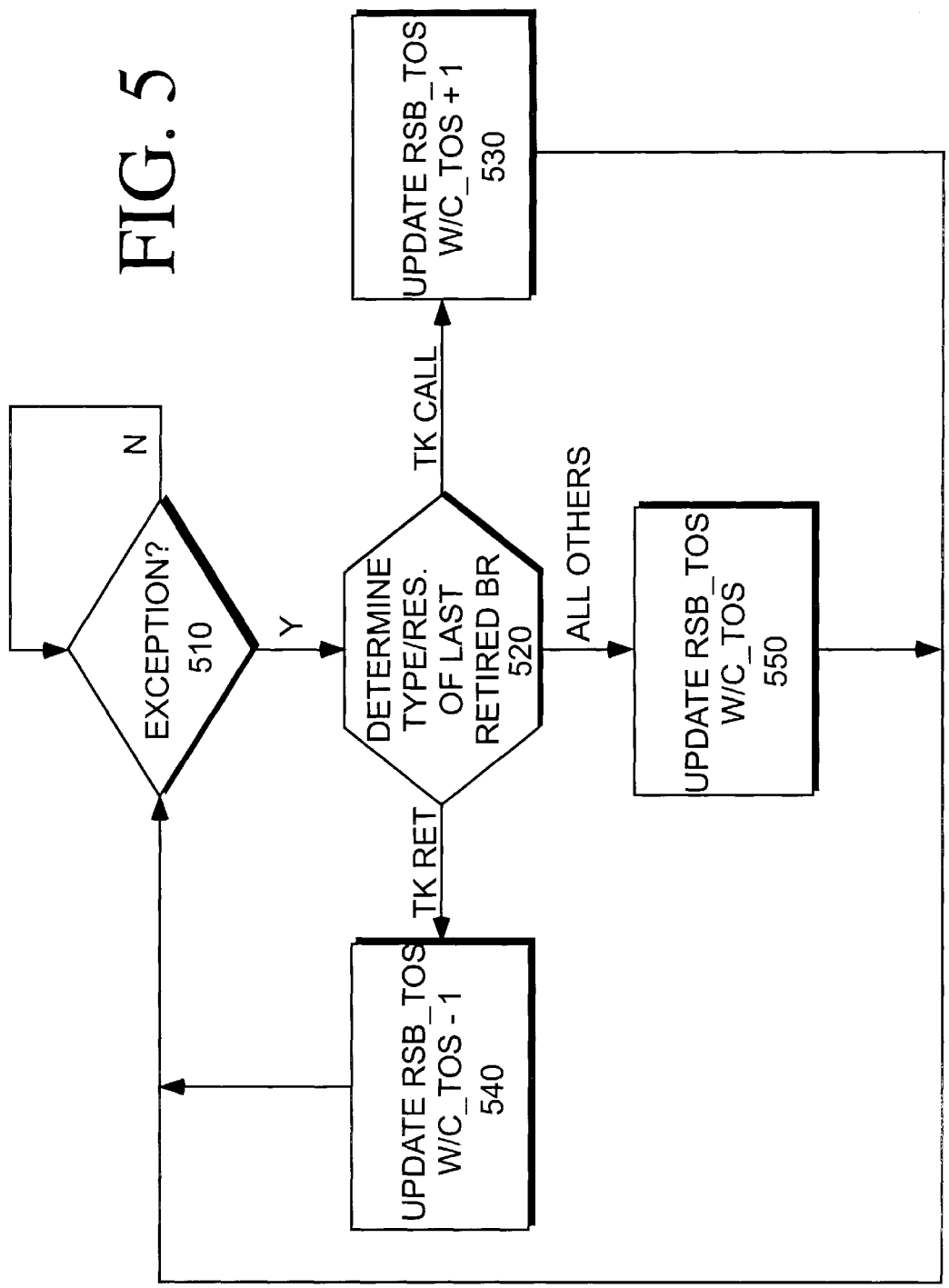
FIG. 5 is a flowchart representing a method for updating the top of stack pointer for a return stack buffer on exceptions.

FIG. 5 represents a method 500 for updating RSB_TOS when an exception is detected, as indicated in Table 2. When an exception is detected 510, the type and resolution of the last branch to be retired is determined 520. For example, BRU 170 may provide data (C_TOS) on the last retired branch. If the last retired branch is determined 520 to be a call that was resolved TK, RSB_TOS is updated 530 to C_TOS+1. Here, C_TOS is the value associated with the retired call. If the last retired branch is determined 520 to be a return that was resolved TK, RSB_TOS is updated 540 to the associated C_TOS−1. For all other combinations of branch types/resolutions, RSB_TOS is updated 550 to the value of C_TOS associated with the last retired branch. The same update mechanism may be applied to other exceptions that trigger back end flushes.

Table 3 shows the types of updates generated by TOS controller 318 in response to branch mispredictions, e.g. when conditionally executed branches, including calls and returns, are mispredicted at the front end of processor 100. Here, "i" is the value of RSB_TOS before a branch is predicted. It is stored together with the prediction information for the branch. Thus, PUSH(i+1) pushes data onto the RSB at the entry indicated by RSB_TOS after branch prediction, and POP(i−1) pops data from the RSB at the entry indicated by the RSB_TOS value prior to the previous branch instruction.

TABLE 3

| BR Type | Predicted Resolution | RSB Update | Actual Resolution | TA Prediction | RSB_TOS Update |
|---|---|---|---|---|---|
| CALL | TK | PUSH(i + 1) | TK | CORRECT | None |
| CALL | TK | PUSH(i + 1) | TK | WRONG | Write i + 1 to IBP_TOS |
| CALL | TK | PUSH(i + 1) | NT | DC | Write i to RSB_TOS |
| CALL | NT | NONE | TK | DC | Write i + 1 to RSB_TOS |
| CALL | NT | NONE | NT | DC | None |
| RETURN | TK | POP(i − 1) | TK | CORRECT | None |
| RETURN | TK | POP(i − 1) | TK | WRONG | Write i − 1 to RSB_TOS |
| RETURN | TK | POP(i − 1) | NT | DC | Write i to RSB_TOS |
| RETURN | NT | NONE | TK | DC | Write i − 1 to RSB_TOS |
| RETURN | NT | NONE | NT | DC | None |
| OTHER BR | TK | NA | TK | CORRECT | None |
| OTHER BR | TK | NA | TK | WRONG | Write i to RSB_TOS |
| OTHER BR | TK | NA | NT | DC | Write i to RSB_TOS |
| OTHER BR | NT | NA | TK | DC | Write i to RSB_TOS |
| OTHER BR | NT | NA | NT | DC | None |

Figure 6:
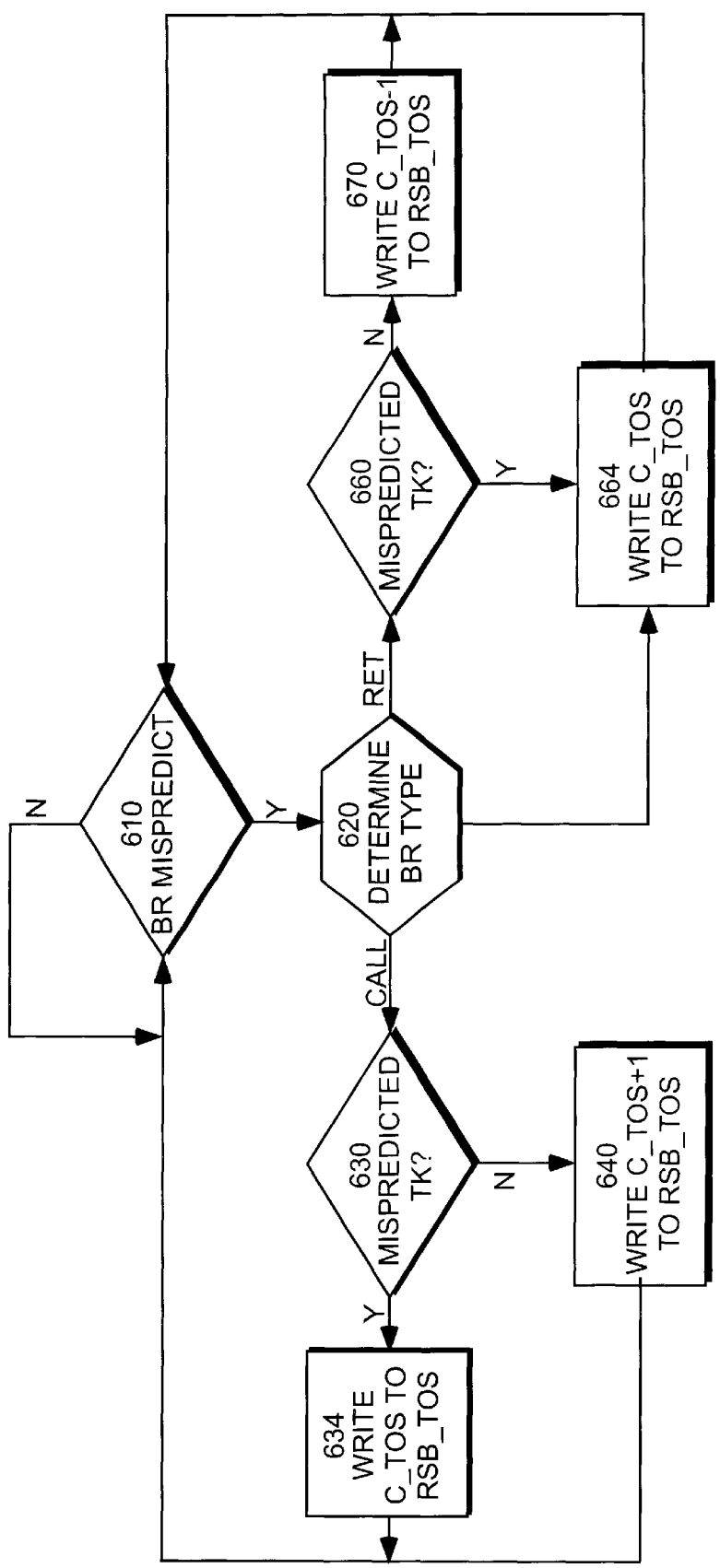
FIG. 6 is a flowchart representing a method for updating the top of stack pointer for a return stack buffer on branch mispredictions.

FIG. 6 represents one embodiment of method 600 for updating RSB 194 in response to a branch misprediction. When a branch misprediction is detected 600, the type of branch causing the misprediction is determined 620. This information may be provided, for example, by BRU 170 or an associated validation unit. If the mispredicted branch is determined 630 to be a call, and the call is determined 634 to have been mispredicted as TK, e.g. it was resolved NT, RSB_TOS is updated to the value of C_TOS associated with the call. If the call is determined 630 to not have been mispredicted TK, e.g. it was mispredicted as NT or the target address was mispredicted, RSB_TOS is updated to C_TOS+1.

If the mispredicted branch is determined 620 to be a return, and the return is determined 660 to have been mispredicted TK, e.g. it was resolved NT, RSB_TOS is updated 664 to the associated value of C_TOS. If the mispredicted return is determined 660 not to have been mispredicted as TK, e.g. it was mispredicted as NT or the target address was mispredicted, RSB_TOS is updated 670 to C_TOS−1.

Finally, if the mispredicted branch is determined 620 to be any branch other than a call or a return, RSB_TOS is updated 664 to C_TOS.

There has thus been provided a system and method for predicting target addresses for conditional call and return branch instructions. The system includes a return stack buffer and a pointer module to update a pointer to the top of the return stack buffer (RSB_TOS). As each branch instruction is detected, it is associated with copy of the RSB_TOS prior to any updates of the RSB by the branch instruction. The RSB is updated to reflect call and return instructions that are predicted taken. Various branch prediction structures may provide predicted branch information to the system for this purpose. If the call or return instruction is later determined to be mispredicted, the pointer module adjusts the associated copy of the RSB_TOS according to the type of misprediction detected, and uses updates the current RSB_TOS with the adjusted value. A branch execution unit provides resolved branch information, which may be used to identify mispredictions.

What is claimed is:

1. An apparatus comprising:
   a branch predictor to detect a branch instruction and to predict whether the detected branch instruction will be taken;
   a branch execution unit to determine whether a branch instruction is mispredicted;
   a return stack buffer (RSB) having a plurality of entries, the RSB to store a return address to or retrieve a return address from an entry indicated by a current top-of-stack pointer (TOS) responsive to the detected branch instruction being a call or return branch instruction, respectively, that is predicted taken; and
   a pointer module coupled to the RSB to associate a copy of the current TOS with each detected branch instruction for propagation to the branch execution unit, to update the current TOS for each detected branch instruction that is a call or return instruction that is predicted taken, and if a branch instruction is mispredicted, to replace the current TOS with a value determined from the TOS copy associated with the mispredicted branch instruction.

2. The apparatus of claim 1, wherein the pointer module includes a TOS controller to receive the TOS copy associated with mispredicted branch instruction from the branch execution unit, to adjust the received copy, and to replace the current TOS with the adjusted copy.

3. The apparatus of claim 2, wherein the pointer module includes a TOS controller to receive branch prediction information to update the TOS for call and return instructions that are predicted taken.

4. The apparatus of claim 1, wherein the mispredicted branch is a call instruction that has been mispredicted not taken (NT) and the pointer module receives the TOS copy associated with the mispredicted call instruction, increments the copied TOS and replaces the current TOS with the incremented copied TOS.

5. The apparatus of claim 1, wherein the mispredicted branch is a return instruction that has been mispredicted as taken (TK) and the pointer module receives the TOS copy associated with the mispredicted return instruction, decrements the copied TOS by one, and replaces the current TOS with the decremented copied TOS.

6. The apparatus of claim 1, wherein the mispredicted branch is a call instruction having a mispredicted target address, and the pointer module receives the TOS copy associated with the mispredicted return instruction, increments the TOS copy, and replaces the current TOS with the incremented TOS copy.

7. The apparatus of claim 1, wherein the mispredicted branch is a return instruction having a mispredicted target address, and the pointer module receives the TOS copy associated with the mispredicted return instruction, decrements the TOS copy, and replaces the current TOS with decremented TOS copy.

8. A method for predicting return addresses using a return stack buffer and a top-of-stack pointer (TOS) to indicate an active entry in the return stack buffer, the method comprising:
   detecting a branch instruction;
   associating a copy of the TOS with the branch instruction;
   incrementing the TOS and storing a return address at an entry indicated by the incremented TOS if the branch instruction is a call instruction that is predicted taken;
   retrieving a return address at the entry indicated by the TOS and decrementing the TOS when the branch instruction is a return instruction that is predicted taken;
   propagating the branch instruction and its associated TOS copy to a branch execution unit; and
   providing the copy of the TOS to the return stack buffer if the associated branch instruction is determined to be mispredicted.

9. The method of claim 8, further comprising:
   adjusting the provided copy of the TOS according to the type of branch misprediction; and
   updating the TOS with the adjusted copy of the TOS.

10. The method of claim 8, further comprising maintaining the TOS when the detected branch instruction is a call or return instruction that is predicted not taken.

11. The method of claim 8, further comprising:
   detecting an exception;
   determining a type and resolution of a last branch to be retired;
   adjusting the copy of the TOS associated with the last branch according to its type and resolution; and
   updating the TOS with the adjusted copy of the TOS.

12. A processor comprising:
   a branch prediction unit to predict a direction for a branch instruction;
   a branch execution unit to receive the branch instruction and a stack pointer value associated with the branch instruction, to resolve a direction for the branch instruction and to provide the associated stack pointer value if the resolved and predicted directions do not match; and a return address predictor that includes;
    a return stack buffer (RSB) to store a target address of a call branch instruction that is predicted taken at an entry indicated by a current TOS;
    a pointer module to update the current TOS according to a predicted direction for a call or return instruction and to replace the current TOS with a value determined from the stack pointer value associated with the mispredicted branch instruction.

13. The processor of claim 12, wherein the pointer module updates the RSB when the predicted direction of the call or return instruction is taken.

14. The processor of claim 12, wherein the pointer module associates a copy of the current TOS with each branch instruction and, when a branch instruction is mispredicted by the branch prediction unit, adjusts the TOS copy according to the type of misprediction.

* * * * *

UNITED STATES PATENT AND TRADEMARK OFFICE
CERTIFICATE OF CORRECTION

PATENT NO.   : 6,253,315 B1
DATED        : June 26, 2001
INVENTOR(S)  : Yeh

It is certified that error appears in the above-identified patent and that said Letters Patent is hereby corrected as shown below:

<u>Title page,</u>
Item [54], delete "RETURN ADDRESS PREDICTOR THAT USES BRANCH INSTRUCTIONS TO TRACK A LAST VALID RETURN ADDRSS", and replace with -- RETURN ADDRESS PREDICTOR USING A COPY OF A TOP OF STACK POINTER TO TRACK A LAST VALID RETURN ADDRESS --.

Signed and Sealed this

Thirteenth Day of August, 2002

*Attest:*

*Attesting Officer*

JAMES E. ROGAN
*Director of the United States Patent and Trademark Office*